US011012480B2

(12) United States Patent
Mankoff

(10) Patent No.: US 11,012,480 B2
(45) Date of Patent: *May 18, 2021

(54) MODIFYING SIGNAL ASSOCIATIONS IN COMPLEX COMPUTING NETWORKS

(71) Applicant: Jeffrey W. Mankoff, Dallas, TX (US)

(72) Inventor: Jeffrey W. Mankoff, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/459,602

(22) Filed: Jul. 1, 2019

(65) Prior Publication Data
US 2019/0327276 A1    Oct. 24, 2019

Related U.S. Application Data

(63) Continuation of application No. 15/147,884, filed on May 5, 2016, now Pat. No. 10,341,395, which is a continuation-in-part of application No. 13/231,946, filed on Sep. 13, 2011, now abandoned.

(60) Provisional application No. 61/382,464, filed on Sep. 13, 2010.

(51) Int. Cl.
*G06F 15/16* (2006.01)
*H04L 29/06* (2006.01)
*G06N 20/00* (2019.01)

(52) U.S. Cl.
CPC ......... *H04L 65/1073* (2013.01); *G06N 20/00* (2019.01)

(58) Field of Classification Search
CPC .................................................. G06Q 30/0239
USPC .......................................................... 709/219
See application file for complete search history.

(56) References Cited

U.S. PATENT DOCUMENTS

| 2004/0128241 A1* | 7/2004 | Akama ................. G06Q 20/10 705/39 |
| 2011/0313918 A1* | 12/2011 | Lawson ............... G06Q 20/102 705/40 |
| 2013/0117094 A1* | 5/2013 | Jones ................. G06Q 30/0222 705/14.35 |
| 2014/0172574 A1* | 6/2014 | Iriyama ............. G06Q 30/0261 705/14.58 |
| 2014/0236696 A1* | 8/2014 | Robinson, Jr. ..... G06Q 30/0225 705/14.26 |
| 2015/0371254 A1* | 12/2015 | Pugh ................ G06Q 30/0224 705/14.25 |
| 2016/0225008 A1* | 8/2016 | Song ................ G06Q 30/0233 |
| 2016/0343018 A1* | 11/2016 | Balk ...................... G06Q 30/02 |

* cited by examiner

*Primary Examiner* — Hamza N Algibhah
(74) *Attorney, Agent, or Firm* — James H. Ortega; Carstens & Cahoon, LLP

(57) ABSTRACT

This disclosure is directed to an apparatus for modifying a temporal data association in a complex computing network such that a future computing operation is executed based on the modified data association.

20 Claims, 2 Drawing Sheets

US 11,012,480 B2

MODIFYING SIGNAL ASSOCIATIONS IN COMPLEX COMPUTING NETWORKS

CROSS-REFERENCE TO RELATED APPLICATIONS

The present application is a continuation of U.S. application Ser. No. 15/147,884, filed May 5, 2016, which is a continuation-in-part of U.S. application Ser. No. 13/231,946, filed Sep. 13, 2011, which is a non-provisional of U.S. Application No. 61/382,464, filed Sep. 13, 2010, all of which are incorporated by reference herein for all purposes.

TECHNICAL FIELD

This disclosure is directed to modifying temporal signal associations in complex computing networks.

BACKGROUND

There is a need for seamlessly changing a temporal association of a signal in a complex computing network, and there is a need for intelligent computing operation execution based on modified signal association.

BRIEF SUMMARY

In some embodiments, an apparatus is provided for modifying a temporal signal association in a complex computing network such that a future computing operation is intelligently executed based on the modified signal association. The apparatus may perform the functions of: determining association of a movable matching signal with a first signal; receiving registration of a second signal with the signal matching server; in response to receiving the registration of the second signal with the signal matching server, disassociating the matching signal from the first signal and associating the matching signal to the second signal, wherein: a computing operation is executed using the second signal; in response to determining the computing operation executed using the second signal, a determination is made whether a matching signal is associated with the second signal; and in response to determining the matching signal is associated with the second signal, the computing operation is executed based on at least one of the matching signal and the second signal.

In some embodiments, a computing operation is executed using the first signal; in response to determining the computing operation executed using the first signal, a determination is made whether a matching signal is associated with the first signal; and in response to determining the matching signal is not associated with the first signal, the computing operation is executed based on the first signal.

In some embodiments, notification of the matching signal is transmitted from a computing system associated with the first signal to a computing system associated with the second signal.

In some embodiments, in response to determining the computing operation is executed based on the matching signal and the second signal, transmitting a provisioning signal to a system associated with the first signal or associating the provisioning signal with the first signal.

In some embodiments, the provisioning signal comprises a second movable matching signal.

In some embodiments, the first signal or the second signal comprises an identification signal.

In some embodiments, the first signal or the second signal is at least one of not movable and not temporal.

In some embodiments, the computing operation is a real-time computing operation conducted at an input signal system comprising a real-time sensor.

In some embodiments, the matching signal is associated with a specific resource, and wherein a determination is made, at the input signal system, whether a signal associated with the specific resource matches the matching signal.

In some embodiments, the computing operation is executed based on the matching signal and the second signal if the signal associated with the specific resource matches the matching signal.

In some embodiments, the computing operation is executed based on the second signal, and not the matching signal if the signal associated with the specific resource does not match the matching signal.

In some embodiments, the first signal and the second signal are registered with a signal matching server.

In some embodiments, the matching signal is disassociated from the second signal upon execution of the computing operation in response to determining an attribute associated with the matching signal is extinguished.

In some embodiments, prior to the registration of the second signal with the signal matching server, the matching signal is pre-associated with the second signal.

In some embodiments, notification of the pre-association is communicated to a computing system associated with the second signal.

In some embodiments, the apparatus is further for determining whether the second signal is registered with the signal matching server; and in response to determining the second signal is not registered with the signal matching server, receiving registration of the second signal to the signal matching server.

In some embodiments, the computing operation affects an attribute of at least one of the matching signal and the second signal.

In some embodiments, the computing operation affects an attribute of the first signal.

In some embodiments, an apparatus is provided for modifying a temporal data association in a complex computing network, the apparatus is configured or operable for: determining association of movable associative data with first data; determining registration of second data with a data association server; in response to determining the registration of the second data with the data association server, dissociating the movable associative data from the first data and associating the movable associative data with the second data, wherein: a computing operation is initiated using the second data, in response to determining the computing operation is initiated using the second data, a determination is made whether associative data is associated with the second data, in response to determining the movable associative data is associated with the second data, the computing operation is executed based on the movable associative data, wherein, upon execution of the computing operation, the movable associative data is dissociated from the second data, or rendered inoperable for a future computing operation, based on determining an attribute associated with the movable associative data is extinguished, wherein the computing operation is a substantially real-time computing operation initiated at a first input data system comprising a substantially real-time sensor, wherein: a second computing operation is initiated using the first data, in response to determining the second computing operation is initiated using the first data, a determination is made whether associative data is associated with the first data, and in response to determining the movable associative data is not associated with the first data, the second computing operation is executed based on the first data, and not based on the movable associative data, wherein the second computing operation is a second substantially real-time computing operation initiated at a second input data system comprising a second substantially real-time sensor, and wherein the first data and the second data are storable.

In some embodiments, notification of the movable associative data is transmitted to a first computing system associated with the first data or to a second computing system associated with the second data. In some embodiments, the apparatus is further for: in response to determining the computing operation is executed based on the movable associative data, transmitting provisioning data to a first computing system associated with the first data or associating the provisioning data with the first data. In some embodiments, the provisioning data comprises second movable associative data. In some embodiments, the first data or the second data comprises identification data. In some embodiments, the movable associative data is associated with a resource or an entity, and wherein a determination is made, at the first input data system or by the apparatus, whether data associated with the resource or the entity matches or is associated with the movable associative data. In some embodiments, the computing operation is executed based on the movable associative data in response to determining that the data associated with the resource or the entity matches or is associated with the movable associative data. In some embodiments, a third computing operation is executed based on the second data, and not based on the movable associative data, in response to determining the data associated with the resource or the entity does not match the movable associative data. In some embodiments, the first data and the second data are registered with the data association server. In some embodiments, prior to the registration of the second data with the data association server, the movable associative data is associated with the second data.

In some embodiments, notification of the association of the movable associative data with the second data is communicated to a computing system associated with the second data. In some embodiments, the apparatus is for: determining whether the second data is registered with the data association server; and in response to determining the second data is not registered with the data association server, initiating registration of the second data with the data association server. In some embodiments, the computing operation affects an attribute of at least one of the movable associative data, the first data, or the second data. In some embodiments, the first input data system or the second input data system comprises or is comprised in a mobile computing system or a non-mobile computing system. In some embodiments, the mobile computing system comprises a watch. In some embodiments, the apparatus comprises or is comprised in at least one of a remote computing system, a local computing system, the first input data system or the second input data system.

In some embodiments, a method is provided for modifying a temporal data association in a complex computing network, the method comprising: determining, using one or more computing device processors, association of movable associative data with first data; determining, using the one or more computing device processors, registration of second data with a data association server; in response to determining the registration of the second data with the data association server, dissociating, using the one or more computing device processors, the movable associative data from the first data and associating the movable associative data with the second data, wherein: a computing operation is initiated using the second data, in response to determining the computing operation is initiated using the second data, a determination is made whether associative data is associated with the second data, in response to determining the movable associative data is associated with the second data, the computing operation is executed based on the movable associative data, wherein, upon execution of the computing operation, the movable associative data is dissociated from the second data, or rendered inoperable for a future computing operation, based on determining an attribute associated with the movable associative data is extinguished, wherein the computing operation is a substantially real-time computing operation initiated at a first input data system comprising a substantially real-time sensor, wherein: a second computing operation is initiated using the first data, in response to determining the second computing operation is initiated using the first data, a determination is made whether associative data is associated with the first data, and in response to determining, using the one or more computing device processors, the movable associative data is not associated with the first data, the second computing operation is executed based on the first data, and not based on the movable associative data, wherein the second computing operation is a second substantially real-time computing operation initiated at a second input data system comprising a second real-time sensor, wherein the first data and the second data are storable. In some embodiments, the one or more computing device processors are comprised in at least one of a remote computing system, a local computing system, the first input data system or the second input data system.

In some embodiments, an apparatus for modifying a temporal data association in a complex computing network, the apparatus is configured or operable for: determining association of movable associative data with first data; determining registration of second data with a data association server; in response to determining the registration of the second data with the data association server, dissociating the movable associative data from the first data and associating the movable associative data with the second data, wherein: a computing operation is initiated using the second data, in response to determining the computing operation is initiated using the second data, a determination is made whether associative data is associated with the second data, in response to determining the movable associative data is associated with the second data, the computing operation is executed based on the movable associative data, wherein, upon execution of the computing operation, the movable associative data is dissociated from the second data, or rendered inoperable for a future computing operation, based on determining an attribute associated with the movable associative data is extinguished, wherein the computing operation is a substantially real-time computing operation initiated at a first input data system, wherein: a second computing operation is initiated using the first data, in response to determining the second computing operation is initiated using the first data, a determination is made whether associative data is associated with the first data, in response to determining the movable associative data is not associated with the first data, the second computing operation is executed based on the first data, and not based on the movable associative data, wherein the second computing operation is a second substantially real-time computing operation initiated at a second input data system, wherein the first data and the second data are storable. In some embodiments, the apparatus comprises or is comprised in at least one of a remote computing system, a local computing system, the first input data system or the second input data system.

Figure 1:
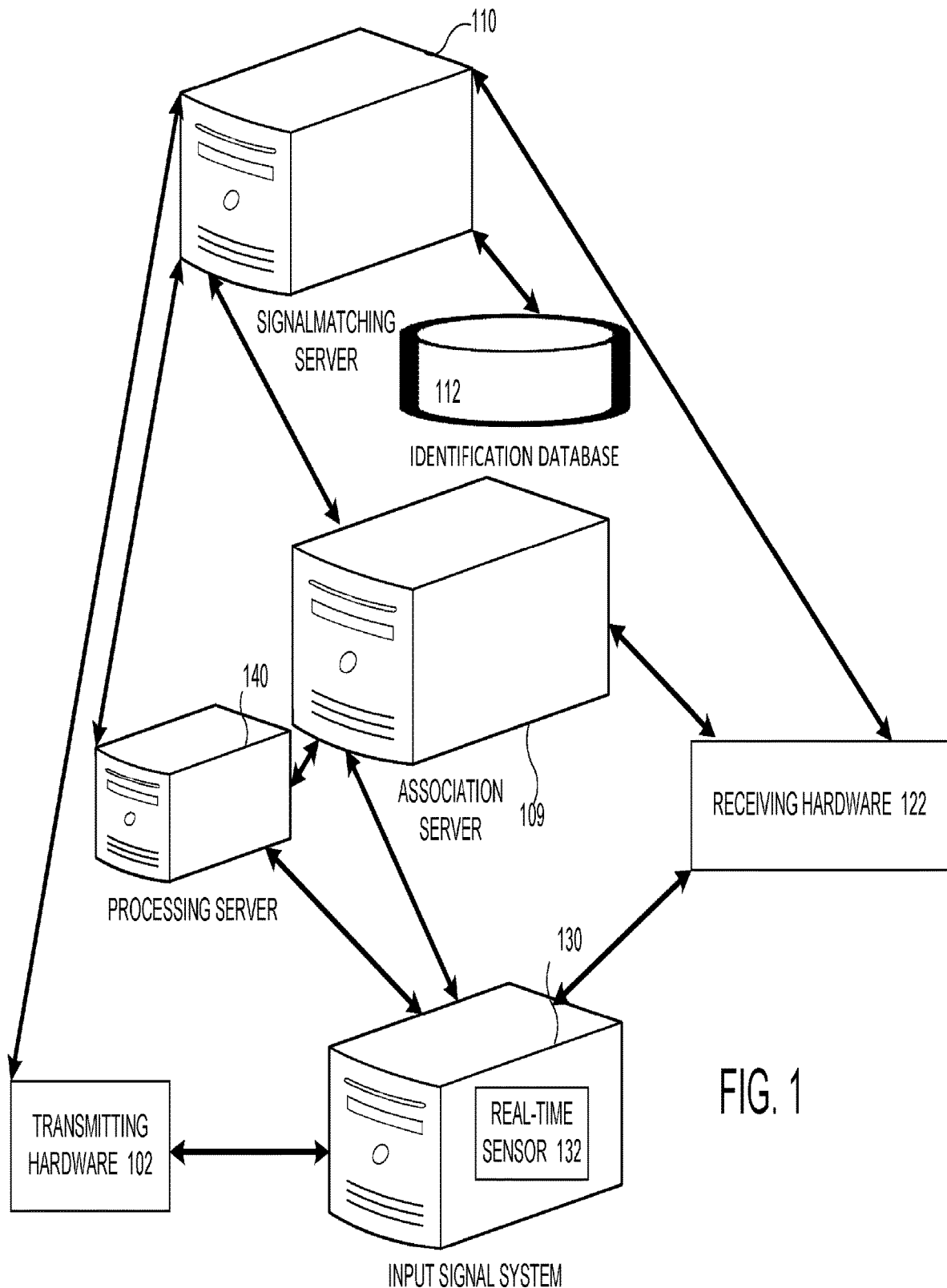
FIG. 1 is a block diagram of a complex computing network for modifying signal associations, in accordance with some embodiments of the invention.

All of these drawings are illustrations of certain embodiments. The scope of the claims is not limited to the specific embodiments illustrated in the drawings and described below.

DETAILED DESCRIPTION OF THE EMBODIMENTS

FIG. 1 is a block diagram of a complex computing network for modifying signal associations in the complex computing network. FIG. 1 may comprise transmitting hardware 102, an input signal system 130 comprising a real-time sensor 132, a processing server 140, an association server 109, receiving hardware 122, a signal matching server 110, and an identification database 112. In some embodiments, the functionality of multiple devices in FIG. 1 may be combined in a single apparatus. The various servers described in this disclosure may refer to apparatuses, systems, devices, users, entities, etc. A server described herein may comprise a processor. Any processor described herein may be an intelligent processor. An intelligent processor may be a processor that learns of signal associations and executes computing operations based on the latest signal associations and signal disassociations. Such apparatuses may also comprise memory that stores computer-readable code, which when executed by the processor, causes the processor and/or other elements in the apparatus to perform the various methods described in this disclosure. In some embodiments, the term, "signal" may refer to "data" or "information". In some embodiments, the association server 109 and the signal matching server 110 may be integrated into a single server. In some embodiments, even though some of the systems of FIG. 1 are not indicated as being connected, they may be connected to each other. In some embodiments, any signal described herein may be transitory. In some embodiments, the terms "using" and "based on" may be equivalent.

In some embodiments, any system described herein may comprise a housing that includes various units. The units may include a processor, a memory unit, an input/output unit, and a communication interface. In some embodiments, a chipset may be disposed in the housing and may be interfaced with the processor such as a signal processor. The chipset may have hardware (e.g., electronic components in an electronic circuit) for supporting various connections within the system (e.g. between units), or any other connection from the system to external systems or devices. The chipset may be an intelligent chipset for initiating an intelligent computing operation or an association or disassociation operation as described herein.

The transmitting hardware 102 may be associated with a first signal or may produce a first signal. The transmitting hardware 102 may be a computing device such as a mobile computing device. Alternatively, the transmitting hardware 102 may be non-computing hardware (e.g., a physical card). An input signal system 130 may comprise a real-time sensor 132. In some embodiments, the real-time sensor 132 may be a point-of-sale terminal such as a computing device (e.g., a mobile computing device, a non-mobile computing device). In some embodiments, the real-time sensor 132 may refer to any real-time means or computing means. The transmitting hardware 102 may transmit a first signal and the real-time sensor 132 may sense (e.g. determine, receive, etc.) the first signal. Any sensor described in this disclosure may be a signal sensor. The first signal may be transmitted to the processing server 140 which executes a computing operation based on the first signal.

A first system associated with the first signal may transmit a message to a second system associated with the second signal. The message may be transmitted over a network (e.g., a social network, a computing network, etc.). The first and second systems may be mobile devices such as mobile phones, tablets, watches, etc. The message may include an intention of transmitting a matching signal to a system associated with the second signal.

In some embodiments, the first signal may be associated with a matching signal. In some embodiments, a computing operation may need to be performed (e.g., based on or using the first signal) in order to associate the matching signal with the first signal. In some embodiments, the first signal may be associated with a matching signal upon the first signal being registered with the signal matching server 110. In some embodiments, the matching signal may be stored in at least one of the signal matching server 110 or the association server 109, and the association of the matching signal with the first signal may be stored in at least one of the signal matching server 110 or the association server 109.

In some embodiments, it may be needed to transfer or transmit the matching signal from being associated with the first signal to being associated with the second signal. The need for transfer may be based on a request signal transferred or transmitted to any of the systems described herein (e.g., the association server 109 and/or the signal matching server 110) from the system associated with the first signal. Upon receiving the transfer request, a determination may be made of whether the second signal is registered with the signal matching server 110. In response to the request signal, a notification signal may be transmitted to a system associated with the second signal. In some embodiments, the system associated with the first signal may comprise the transmitting hardware 102, and the system associated with the second signal may comprise the receiving hardware 122.

If the second signal is already registered with the signal matching server 110, then the notification signal may notify the system associated with the second signal that the second signal is now associated with the matching signal. Alternatively, the notification signal may notify the system associated with the second signal that an acceptance signal may need to be transmitted from the system to in order establish the association. If the second signal is not already registered with the signal matching server 110, then the second signal may need to register with the signal matching server 110. In some embodiments, registration comprises providing identification information associated with the second signal (and/or identification information associated with a system or user associated with the second signal). Upon acceptance or automatic acceptance of the association between the second signal and the matching signal, the first signal is disassociated from the matching signal. In some embodiments, while the first signal is disassociated from the matching signal, the first signal may continue to be virtually associated (or loosely associated) with the matching signal and/or the second signal. Any computing operation that is executed based on both the second signal and the matching signal may result in modification of an attribute associated with the first signal or association of a provisioning signal (e.g., a new matching signal) with the first signal. In order to make this modification happen, either the matching signal or the second signal is virtually associated with the first signal.

The second signal may be used in a computing operation at the input signal system 130. In some embodiments, the computing operation may be executed using an interaction with the receiving hardware 122. The input signal system 130 may forward the second signal to the processing server 140. The processing server 140 and/or the input signal system 13 may determine whether the second signal is associated with a matching signal. In order to determine whether the second signal is associated with a matching signal, the input signal system 130 and/or the processing server 140 may communicate with the association server 109 and/or the signal matching server 110 and/or the identification database 112 (which may store identification signals and first and/or second signals associated with matching signals). A search may be conducted by at least one of the association server 109 and/or the signal matching server 110 and/or the identification database 112 to determine whether the second signal is associated with a matching signal. If a matching signal is not found, the processing server 140 executes a computing operation based on the second signal. If a matching signal is found, the processing server 140 executes a computing operation based on the both, or at least one of, the second signal and the matching signal.

In some embodiments, if a matching signal is found, the determination is communicated to the input signal system 130. At the input signal system 130, a scan may be conducted (either before or after initiating and/or completing the process of determining whether a matching signal is associated with the second signal) to determine the resources (e.g., items, services, etc.) for which the computing operation is to be executed or has been executed. The scan may result in a list of resource signals. The list of resource signals may be associated with a particular session or transaction. In some embodiments, the matching signal may have been previously associated with a particular resource or resource signals. Therefore, the input signal system 130 (and optionally in coordination with the association server 109, the signal matching server 110, and/or the identification database 112) may compare the matching signal with the list of resource signals to determine whether there is a match. If there is a match, then the computing operation is executed (e.g., by the processing server 140) based on both the second signal and the matching signal. If there is no match, then the computing operation is executed based on just the second signal.

In some embodiments, upon execution (e.g., after or simultaneously with) of the computing operation based on both the second signal and the matching signal, a provisioning signal may be transmitted to a system associated with the first signal. The provisioning signal may comprise a new matching signal. The provisioning signal may not be transmitted to the system associated with the first signal if the computing operation is executed based on only the second signal and not based on the matching signal.

In some embodiments, any of the systems described herein may comprise application programming interfaces (APIs) for communicating with any of the other systems described herein. These APIs may be specialized non-generic APIs that are developed for the particular purpose of communicating with particular systems. In some embodiments, a method is provided for performing the various steps performed by any apparatus described herein. In some embodiments, a non-transitory computer-readable medium comprising code is provided for causing a computing device to perform the various methods described herein.

In some embodiments, the various devices of FIG. 1 correspond to and are the equivalent of devices with the same reference numerals (or different reference numerals) of FIG. 1 in the applications incorporated-by-reference below, even though some of the devices of FIG. 1 in the instant application carry different names from the devices of FIG. 1 in the applications incorporated-by-reference below. Although not shown, in some embodiments, the various devices of FIG. 1 include the same elements that are comprised in the devices associated with the same reference numerals (or different reference numerals) of FIG. 1 in the applications incorporated-by-reference below. In some embodiments, the various devices of FIG. 1 perform the same or similar operations as the devices associated with the same reference numerals (or different reference numerals) of FIG. 1 in the applications incorporated-by-reference below. Therefore, in some embodiments, the transmitting hardware 102 may be a form of payment 102, the input signal system 130 may be the merchant 130, the real-time sensor 132 may be the POS terminal 132, the association server 109 may be the vGift store 109, the processing server 140 may be the payment system 140, the signal matching server 110 may be card matching server 110, the identification database 112 may be the user database 112, and the receiving hardware 122 may be the form of payment 122.

Figure 2:
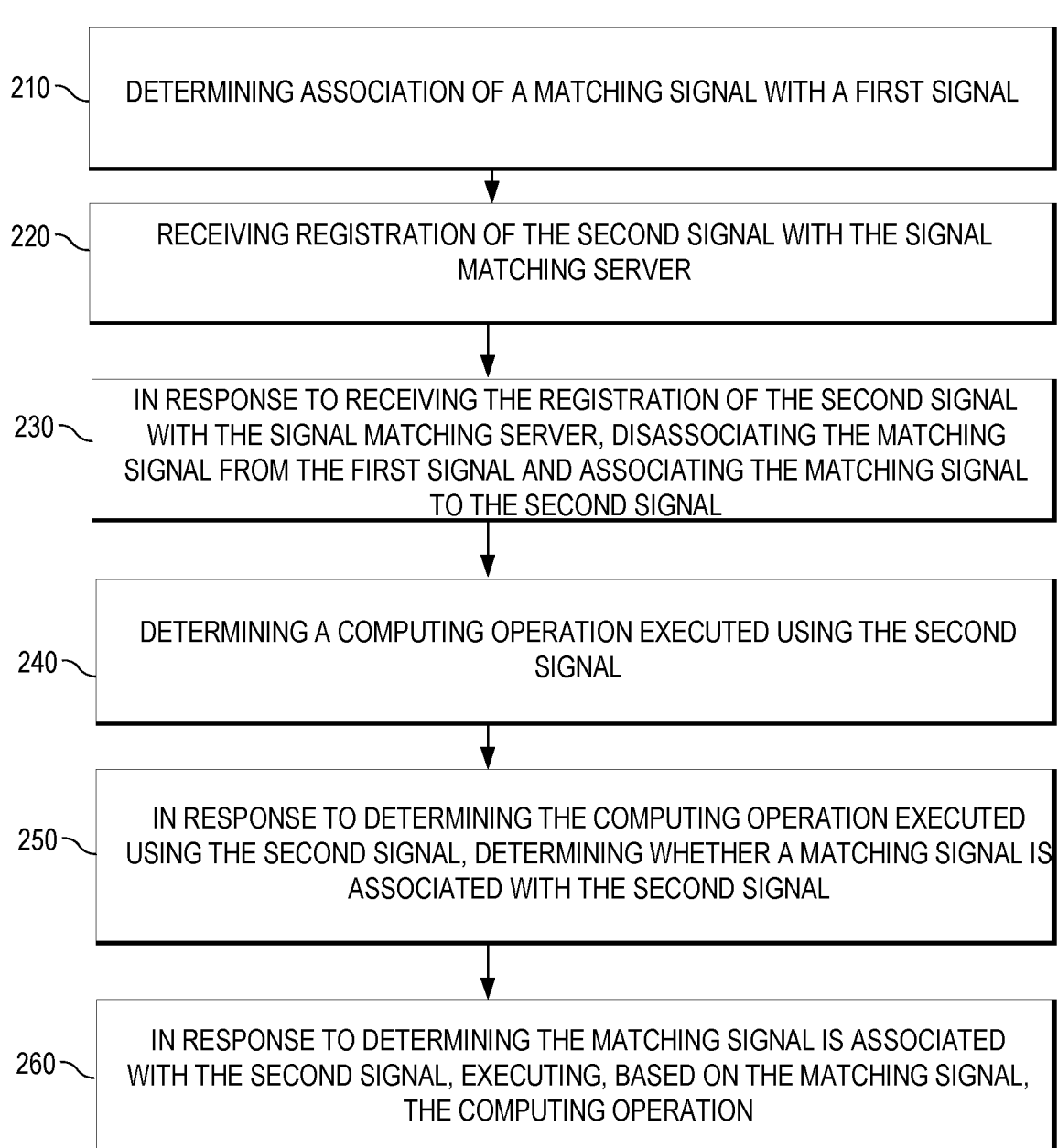
FIG. 2 is a block diagram of a method for modifying signal associations in a complex computing network, in accordance with some embodiments of the invention.

FIG. 2 is a block diagram of a method for modifying signal associations in a complex computing network. The various blocks of FIG. 2 may be executed in a different order from that shown in FIG. 2. At block 210, the method comprises determining association of a matching signal with a first signal. In some embodiments, the first signal is unaffected by the association of the matching signal with the first signal. At block 220, the method comprises receiving registration of the matching signal with a second signal. At block 230, the method comprises in response to receiving the registration of the matching signal with the second signal, disassociating the matching signal from the first signal and associating the matching signal to the second signal. In some embodiments, the first signal is unaffected by the disassociation of the matching signal with the first signal, and the second signal is unaffected by the association of the matching signal with the second signal. At block 240, the method comprises determining a computing operation executed using the second signal. At block 250, the method comprises in response to determining the computing operation executed using the second signal, determining whether a matching signal is associated with the second signal. At block 260, the method comprises in response to determining the matching signal is associated with the second signal, executing, based on the matching signal, the computing operation. In some embodiments, execution of the computing operation affects (e.g., a decreases or extinguishes entirely) an attribute (e.g., a numerical amount) of the second signal or the matching signal. In some embodiments, an attribute could represent a value associated with a signal. In some embodiments, execution of the computing operation (associated with the second signal and the matching signal) affects (e.g., increases) an attribute (e.g., a numerical amount) of the first signal. As described herein, the signal matching server may refer to at least one of the signal matching sever, the association server, and/or the identification database presented in FIG. 1. The present application incorporates-by-reference (IBR) the entirety of U.S. application Ser. No. 13/231,946, filed Sep. 13, 2011, titled "Systems and Methods for Virtual Transferring of Gifts," for all purposes.

The present application incorporates-by-reference the entirety of U.S. Application No. 61/382,464, filed Sep. 13, 2010, titled "Systems and Methods for Virtual Transferring of Gifts," for all purposes.

The present application incorporates-by-reference the entirety of U.S. application Ser. No. 15/076,876, filed Mar. 22, 2016, titled "Real-time Sensors in Complex Computing Networks," for all purposes.

In some embodiments, the transmitting or receiving hardware may comprise a mobile device such as a mobile phone, watch, fitness band, etc. In such embodiments, the signal transmitted from the transmitting or receiving hardware may comprise a signal (e.g., an identification signal) that is unique to the mobile device or to an account associated with the mobile device. For example, such a signal may be a mobile device phone number, or any other device identification numbers. In some embodiments, the mobile device may comprise or have access to (e.g., from a cloud server) digital versions of multiple transmitting or receiving hardware. In some embodiments, the mobile device may include functionality of both the transmitting or receiving hardware and the input signal system. Therefore, the mobile device may perform any process or comprise any feature that is described with respect to the transmitting or receiving hardware and/or the input signal system. For example, any message that may be presented on the display associated with the real-time sensor or the input signal system, may additionally or alternatively be presented on a display of the mobile device. In some embodiments, any of the systems illustrated in FIG. 1 (e.g., the input signal system) may determine that the transmitting or receiving hardware is a mobile device. In response to determining that the transmitting or receiving hardware is a mobile device, the system may prompt the mobile device for transmission of the first or second signal.

In some embodiments, any transmissions between the mobile device and any of the systems may be via any short range (e.g., near field communication, Bluetooth, Bluetooth Low Energy, etc.) or long range wireless transmission mechanisms (e.g., cellular, Wi-Fi, etc.). In some embodiments, the frequency of transmission may not be limited to any particular frequency of the electromagnetic spectrum.

The present invention may have uses in many fields, such as computing science and software, electronic commerce, digital signal processing, medical software, etc. Any exemplary uses are described herein are for illustration purposes only. In some embodiments, the first signal or the second signal may comprise payment information such as payment card information. In some embodiments, the transmitting or receiving hardware may comprise a card such as a payment card, an identification card, a loyalty card, etc., or a device such as a payment device, or mobile device such as a mobile phone or watch. The card may be associated with an amount. In some embodiments, the matching signal may comprise a virtual gift or Vgift, a coupon, a gift card, an offer, a discount, a deal, etc. In some embodiments, a computing operation may refer to a payment operation. Executing a computing operation based on a first or second signal and a matching signal may result in a discount for a purchased resource or service. Executing a computing operation based on just the first or second signal, and not the matching signal, may not result in a discount for a purchased resource or service. A matching signal may be movable because it can be associated and disassociated with first and second signals. A signal may be temporal because it may be associated with a certain validity period. A provisioning signal as described herein may be a reward. An identification signal may be identification information for a user or entity associated with the first or second signal. A real-time computing operation may be a payment operation executed at a point-of-sale terminal. In some embodiments, the matching signal may be associated with a particular purchase item or resource. Upon scanning a shopping cart, a determination may be made whether a purchase item (e.g., a signal associated with the purchase item) matches the matching signal. In some embodiments, a value associated with a signal may refer to an amount of funds associated with a payment card, a virtual gift, a gift card, a coupon, etc. Increasing the value of a signal may represent a deposit while decreasing the value of a signal may refer to a withdrawal. A session or transaction described herein may be a purchase or shopping transaction or session.

As used herein, the term "real-time" or "dynamically" in any context may refer to any of current, immediately after, simultaneously as, substantially simultaneously as, a few microseconds after, a few milliseconds after, a few seconds after, a few minutes after, a few hours after, a few days after, a period of time after, etc. In some embodiments, the term "modify" or "modification" may be interchangeably used with the term "transform" or "transformation.

The present application is a continuation of U.S. application Ser. No. 15/147,884, filed May 5, 2016, titled "Modifying Signal Associations in Complex Computing Networks," which is a continuation-in-part of U.S. application Ser. No. 13/231,946, filed Sep. 13, 2011, titled "Systems and Methods for Virtual Transferring of Gifts," which is a non-provisional of U.S. Application No. 61/382,464, filed Sep. 13, 2010, titled "Systems and Methods for Virtual Transferring of Gifts," all of which are incorporated by reference herein for all purposes.

The present disclosure provides several important technical advantages that will be readily apparent to one skilled in the art from the figures, descriptions, and claims. Moreover, while specific advantages have been enumerated above, various embodiments may include an, some, or none of the enumerated advantages.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention (s, and their equivalents, that are protected thereby. In all instances, the scope of such claims shall be considered on their own merits in light of this disclosure, but should not be constrained by the headings herein.

The invention claimed is:

1. An apparatus for modifying a temporal data association in a complex computing network, the apparatus comprising one or more computing device processors configured for: determining association of movable associative data with first data; determining registration of second data with a data association server; in response to determining the registration of the second data with the data association server, dissociating the movable associative data from the first data and associating the movable associative data with the second data, wherein: a computing operation is initiated using the second data, in response to determining the computing operation is initiated using the second data, a determination is made whether the movable associative data is associated with the second data, in response to determining the movable associative data is associated with the second data, the computing operation is executed based on the movable associative data, wherein, upon execution of the computing operation, the movable associative data is dissociated from the second data, or rendered inoperable for a future computing operation, based on determining an attribute associated with the movable associative data is extinguished, wherein the computing operation is a substantially real-time computing operation initiated at a first input data system comprising a substantially real-time sensor, wherein: a second computing operation is initiated using the first data, in response to determining the second computing operation is initiated using the first data, a determination is made whether the moveable associative data is associated with the first data, and in response to determining the movable associative data is not associated with the first data, the second computing operation is executed based on the first data, and not based on the movable associative data, wherein the second computing operation is a second substantially real-time computing operation initiated at a second input data system comprising a second substantially real-time sensor, and wherein the first data and the second data are storable.

2. The apparatus of claim 1, wherein notification of the movable associative data is transmitted to a first computing system associated with the first data or to a second computing system associated with the second data.

3. The apparatus of claim 1, wherein the apparatus is further for: in response to determining the computing operation is executed based on the movable associative data, transmitting provisioning data to a first computing system associated with the first data or associating the provisioning data with the first data.

4. The apparatus of claim 3, wherein the provisioning data comprises second movable associative data.

5. The apparatus of claim 1, wherein the first data or the second data comprises identification data.

6. The apparatus of claim 1, wherein the movable associative data is associated with a resource or an entity, and wherein a determination is made, at the first input data system or by the apparatus, whether data associated with the resource or the entity matches or is associated with the movable associative data.

7. The apparatus of claim 6, wherein the computing operation is executed based on the movable associative data in response to determining that the data associated with the resource or the entity matches or is associated with the movable associative data.

8. The apparatus of claim 6, wherein a third computing operation is executed based on the second data, and not based on the movable associative data, in response to determining the data associated with the resource or the entity does not match the movable associative data.

9. The apparatus of claim 1, wherein the first data and the second data are registered with the data association server.

10. The apparatus of claim 1, wherein prior to the registration of the second data with the data association server, the movable associative data is associated with the second data.

11. The apparatus of claim 10, wherein notification of the association of the movable associative data with the second data is communicated to a computing system associated with the second data.

12. The apparatus of claim 1, wherein the apparatus is further configured for: determining whether the second data is registered with the data association server; and in response to determining the second data is not registered with the data association server, initiating registration of the second data with the data association server.

13. The apparatus of claim 1, wherein the computing operation affects an attribute of at least one of the movable associative data, the first data, or the second data.

14. The apparatus of claim 1, wherein the first input data system or the second input data system comprises or is comprised in a mobile computing system or a nonmobile computing system.

15. The apparatus of claim 14, wherein the mobile computing system comprises a watch.

16. The apparatus of claim 1, wherein the apparatus comprises or is comprised in at least one of a remote computing system, a local computing system, the first input data system or the second input data system.

17. A method for modifying a temporal data association in a complex computing network, the method comprising: determining, using one or more computing device processors, association of movable associative data with first data; determining, using the one or more computing device processors, registration of second data with a data association server; in response to determining the registration of the second data with the data association server, dissociating, using the one or more computing device processors, the movable associative data from the first data and associating the movable associative data with the second data, wherein: a computing operation is initiated using the second data, in response to determining the computing operation is initiated using the second data, a determination is made whether the moveable associative data is associated with the second data, in response to determining the movable associative data is associated with the second data, the computing operation is executed based on the movable associative data, wherein, upon execution of the computing operation, the movable associative data is dissociated from the second data, or rendered inoperable fora future computing operation, based on determining an attribute associated with the movable associative data is extinguished, wherein the computing operation is a substantially real-time computing operation initiated at a first input data system comprising a substantially real-time sensor, wherein: a second computing operation is initiated using the first data, in response to determining the second computing operation is initiated using the first data, a determination is made whether the moveable associative data is associated with the first data, and in response to determining, using the one or more computing device processors, the movable associative data is not associated with the first data, the second computing operation is executed based on the first data, and not based on the movable associative data, wherein the second computing operation is a second substantially real-time computing operation initiated at a second input data system comprising a second real-time sensor, wherein the first data and the second data are storable.

18. The method of claim 17, wherein the one or more computing device processors are comprised in at least one of a remote computing system, a local computing system, the first input data system or the second input data system.

19. An apparatus for modifying a temporal data association in a complex computing network, the apparatus comprising one or more computing device processors configured for: determining association of movable associative data with first data; determining registration of second data with a data association server; in response to determining the registration of the second data with the data association server, dissociating the movable associative data from the first data and associating the movable associative data with the second data, wherein: a computing operation is initiated using the second data, in response to determining the computing operation is initiated using the second data, a determination is made whether the moveable associative data is associated with the second data, in response to determining the movable associative data is associated with the second data, the computing operation is executed based on the movable associative data, wherein, upon execution of the computing operation, the movable associative data is dissociated from the second data, or rendered inoperable for a future computing operation, based on determining an attribute associated with the movable associative data is extinguished, wherein the computing operation is a substantially real-time computing operation initiated at a first input data system, wherein: a second computing operation is initiated using the first data, in response to determining the second computing operation is initiated using the first data, a determination is made whether the moveable associative data is associated with the first data, in response to determining the movable associative data is not associated with the first data, the second computing operation is executed based on the first data, and not based on the movable associative data, wherein the second computing operation is a second substantially real-time computing operation initiated at a second input data system, wherein the first data and the second data are storable.

20. The apparatus of claim 19, wherein the apparatus comprises or is comprised in at least one of a remote computing system, a local computing system, the first input data system or the second input data system.

* * * * *